United States Patent [19]

Nobe et al.

[11] Patent Number: 5,657,231
[45] Date of Patent: Aug. 12, 1997

[54] ROUTE SETTING METHOD AND ROUTE SETTING APPARATUS IN NAVIGATION SYSTEM, AND NAVIGATION SYSTEM

[75] Inventors: Kenichi Nobe; Morio Araki, both of Kawagoe, Japan

[73] Assignee: Pioneer Electronic Corporation, Tokyo-to, Japan

[21] Appl. No.: 427,818

[22] Filed: Apr. 26, 1995

[30] Foreign Application Priority Data

Apr. 28, 1994 [JP] Japan ................................. 6-091281

[51] Int. Cl.$^6$ ........................... G01C 21/00; G06G 7/78
[52] U.S. Cl. .................... 364/449.3; 340/990; 340/995
[58] Field of Search ..................... 364/443, 444.2, 364/444.3; 73/178 R; 340/988, 990, 995

[56] References Cited

U.S. PATENT DOCUMENTS

| | | | |
|---|---|---|---|
| 4,926,336 | 5/1990 | Yamada | 364/449 |
| 4,937,753 | 6/1990 | Yamada | 364/449 |
| 5,170,353 | 12/1992 | Verstraete | 364/449 |
| 5,272,638 | 12/1993 | Martin et al. | 364/449 |
| 5,369,588 | 11/1994 | Hayami et al. | 364/449 |
| 5,371,678 | 12/1994 | Nomura | 364/444 |
| 5,412,573 | 5/1995 | Barnea et al. | 364/444 |
| 5,475,598 | 12/1995 | Fushimi et al. | 364/449 |
| 5,506,779 | 4/1996 | Kanki | 364/449 |
| 5,513,110 | 4/1996 | Fujita et al. | 364/449 |
| 5,521,826 | 5/1996 | Matsumoto | 364/444 |

FOREIGN PATENT DOCUMENTS

0 323 229  7/1989  European Pat. Off. .

*Primary Examiner*—Gary Chin
*Attorney, Agent, or Firm*—Young & Thompson

[57] ABSTRACT

A route setting method in a navigation system for obtaining a shortest route from a starting position to a destination position, includes the steps of: selecting, out of links each corresponding to a partial route connecting two route positions adjacent to each other on a route, candidacy links each connected to one of confirmed links which include a link corresponding to the partial route connected to the starting position and which have been confirmed; judging whether or not each of the candidacy links selected by the selecting step is able to pass therethrough according to link judgement information, which corresponds to a connection relationship between each of the candidacy links and the confirmed link connected to each of the candidacy links and which is set in advance; confirming one of the candidacy links judged to be able to pass therethrough by the judging step, which has the shortest integrated route distance from the starting position, as a new confirmed link; and repeating the selecting, judging and confirming steps with respect to the confirmed links including the new confirmed link confirmed by the confirming step.

10 Claims, 6 Drawing Sheets

|  | CANDIDACY LINK | CONFIRMED LINK |
|---|---|---|
| S1 | 1 (0,1)<br>2 (0,2) | 1 (0,1) |
| S2 | 2 (0,2)<br>4 (1,3) | 2 (0,2) |
| S3 | 4 (1,3)<br>6 (2,6) | 4 (1,3) |
| S4 | 6 (2,6)<br>8 (4,4) | 8 (4,4) |
| S5 | 6 (2,6)<br>12 (8,5)<br>14 (8,5) | 12 (8,5) |
| S6 | 6 (2,6)<br>14 (8,5)<br>9 (12,9) | 14 (8,5) |
| S7 | 6 (2,6)<br>9 (12,9) | 6 (2,6) |
| S8 | 9 (12,9)<br>10 (6,7) | 10 (6,7) |
| S9 | 9 (12,9)<br>11 (10,8)<br>13 (10,8) | 11 (10,8) |
| S10 | 9 (12,9)<br>13 (10,8)<br>7 (11,10) | 13 (10,8)<br>ARRIVE AT G, HERE |

DEFINITION OF LINK NUMBERS

|  | CANDIDACY NODE | CONFIRMED NODE |
|---|---|---|
| S1 | B (A,1)<br>C (A,2) | B (A,1) |
| S2 | C (A,2)<br>D (B,3) | C (A,2) |
| S3 | D (B,3)<br>E (C,6) | D (B,3) |
| S4 | E (C,6)<br>F (D,4) | F (D,4) |
| S5 | E (F,5)<br>H (F,5) | E (F,5) |
| S6 | H (F,5) | H (F,5) |

FIG. 6A

DIRECTIONAL LINK

FIG. 6B

NON-DIRECTIONAL LINK

ROUTE SETTING METHOD AND ROUTE SETTING APPARATUS IN NAVIGATION SYSTEM, AND NAVIGATION SYSTEM

BACKGROUND OF THE INVENTION

1. Field of the Invention

The present invention generally relates to a route setting method and a route setting apparatus in a navigation system, and more particularly to a route setting method and a route setting apparatus used in a car navigation system for performing a route self-guidance of a vehicle to a destination.

2. Description of the Related Art

There is a so-called "built-in type navigation apparatus" as a measuring apparatus for various movable bodies such as a vehicle, an airplane, a ship etc. This built-in type navigation apparatus is constructed to obtain two dimensional displacement (i.e. a vector amount) of the movable body from an azimuth data of an azimuth sensor and speed data of a speed sensor and obtain a present position by integrating this two dimensional displacement on a standard point. Namely, in case of an automobile for example, it is constructed such that the number of pulses which are generated during one rotation of a drive shaft is set in advance, and that the travel distance is obtained by multiplying a distance, which is calculated from the total number of the pulses generated from the standard point to the present position, by a distance correction coefficient.

There is also a GPS (Global Positioning System) type navigation apparatus as a measuring apparatus, which utilizes artificial satellites. This GPS type navigation apparatus is constructed as follows. Namely, it receives electric waves of three or more GPS satellites normally, and calculates a present position of a receiving point from the pseudo-distance data, which include a time offset of a receiver between each GPS satellite and the receiving point and the positional data of each GPS satellite. Then, an information processing device reads out map data, which include the calculated present position, from a map data storing device, to take in the data. Then, the information processing device forms image data from the taken-in map data and the information of the present position, and sends it to the display device to perform the image display. By this image, the automobile driver etc. who is a user can recognize the present position in relation with the map.

The above described navigation apparatus may perform not only a display of a vehicle in the above described manner but also an automatic route setting operation by inputting a starting position and a destination, so as to guide a vehicle to the destination on the basis of the automatically set shortest route.

In such an automatic route setting operation, as a method for automatically performing the route setting operation, there is the Dijkstra method.

The Dijkstra method determines the shortest route by determining a node, which corresponds to a route position such as a crossing to be routed, one after another from the small peripheral area around the starting position (starting node), and gradually expands the area for determining the node to finish the process at the time when the shortest route to the destination (objective node) is finally obtained.

The algorithm of the Dijkstra method is as following.

Namely, all of the nodes which are connected to the starting node via links are set as candidacy nodes. Then, the node with the minimum cost (link length is the minimum) is set as a confirmed node. Then, all of the nodes which are connected to the confirmed node via links are set as new candidacy nodes. However, in the event that there is a node which has already been a candidacy node, if the cost to the confirmed node is small, the route passing through the confirmed node is adopted as the shortest route. Finally, the above processes of setting the node and adopting the route are repeated, and when the objective node coincides with the confirmed node, the process is ended.

By this algorithm, the shortest route from the starting position to the destination can be automatically obtained according to the Dijkstra method.

However, according to the study and analysis conducted by the inventors of the present application, this route setting method in the navigation system by means of the Dijkstra method has a serious drawback as explained hereinbelow with referring to FIG. 3 and FIG. 5.

Figure 3:
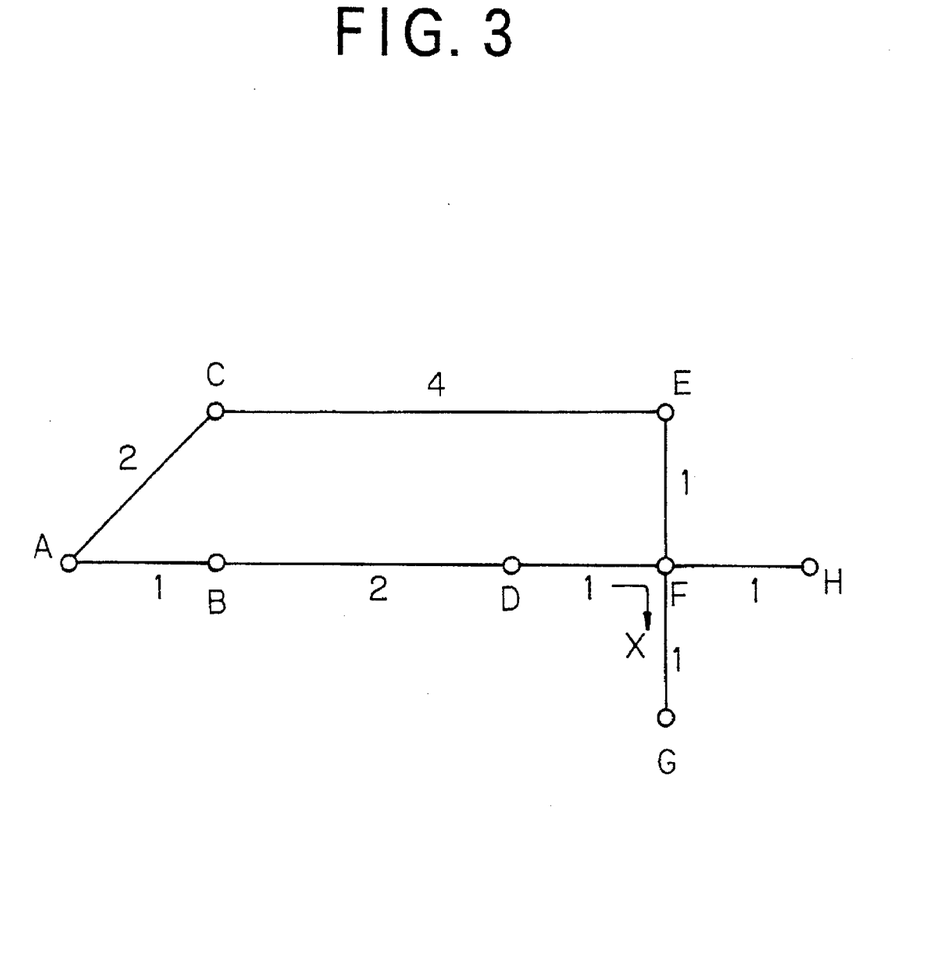
FIG. 3 is a route diagram for explaining a concrete operation of the embodiment as well as the related art.

FIG. 3 is a route diagram for explaining a concrete operation of the route setting system.

In FIG. 3, it is assumed that the starting position is node A and the destination is node G, the route of node D → node F → node G cannot be adopted since the right turn is prohibited thereon, and the U turn is also prohibited. Each numeral represents a link length i.e. a distance between nodes.

Figure 5:
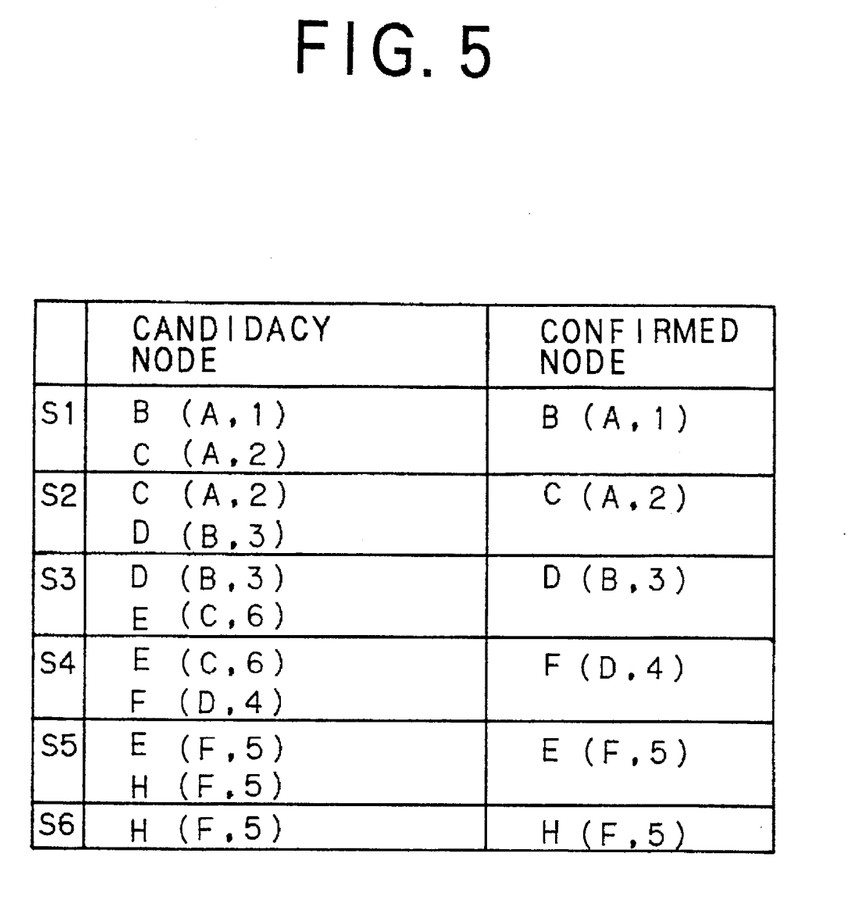
FIG. 5 is a diagram for explaining a concrete operation of the related art.

FIG. 5 is a diagram for explaining a concrete operation of the route setting system.

In FIG. 5, in the expression X (Y, Z), X represents the candidacy node name, Y represents the previous node name before arriving at the candidacy node X by one node, and Z represents the integrated cost (integrated distance) up to the candidacy node X.

Firstly, the candidacy nodes obtained as for the node A which is the starting position are nodes B and C. Since the node which has the minimum cost among these candidacy nodes is the node B, the node B is adopted as the confirmed node.

As a result, the node D which is connected to the node B is adopted as the new candidacy node, and the candidacy nodes become the nodes C and D. Since, among these candidacy nodes, the node which has the minimum cost is the node C, the node C is adopted as the confirmed node.

Successively, the node E which is connected to the node C is adopted as the new candidacy node, and the candidacy nodes become the nodes D and E. Since, among these candidacy nodes, the node which has the minimum cost is the node D, the node D is adopted as the confirmed node.

Further, node F which is connected to node E is adopted as the new candidacy node, and the candidacy nodes become the nodes E and F. Since, among these candidacy nodes, the node which has the minimum cost is node F, node F is adopted as the confirmed node.

Here node E which is connected to node F has been already adopted as the candidacy node. Since the cost becomes smaller in case of reaching node E through node F, node E passing via node F is adopted as the new candidacy node. Node H which is connected to node F is also adopted as the candidacy node. On the other hand, node G is not adopted as the candidacy node since the right turn is prohibited on the route of node D → node F → node G.

Although each of the candidacy nodes E and H has the minimum cost, since, node E has been already adopted as the candidacy node in the previous step, node E is adopted as the confirmed node because the priority thereof is higher.

In the event that a plurality of nodes each having the minimum cost are adopted simultaneously as the candidacy nodes, the node with the smallest node number among these nodes is adopted as the confirmed node. For example, if they are node A and node C, node A is adopted as the confirmed node, and if they are node E and node D, node D is adopted as the confirmed node.

There remains only node H, which is adopted as the confirmed node.

In this manner, according to the study and analysis by the inventors of the present application, in the above explained route setting method by means of the Dijkstra method, there arises a case where the node G, i.e. the destination, cannot be reached if the traffic regulation etc. is considered, which is a serious problem in the navigation system in a practical sense.

Figure 6A:
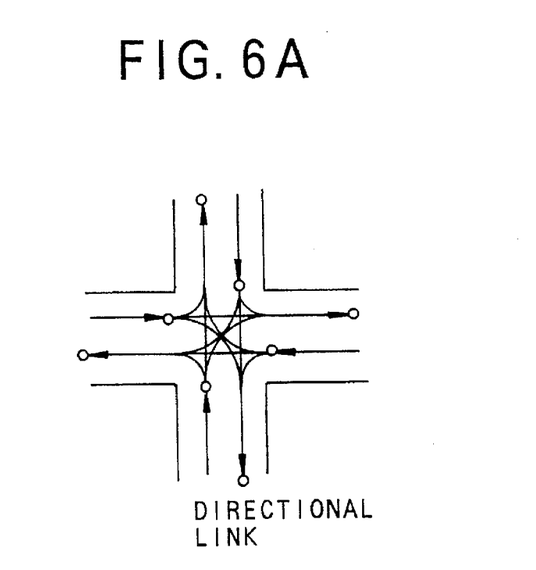
FIGS. 6A–6B are the diagrams for explaining a difference in the data amount between a directional graph and a non-directional graph.
Figure 6B:
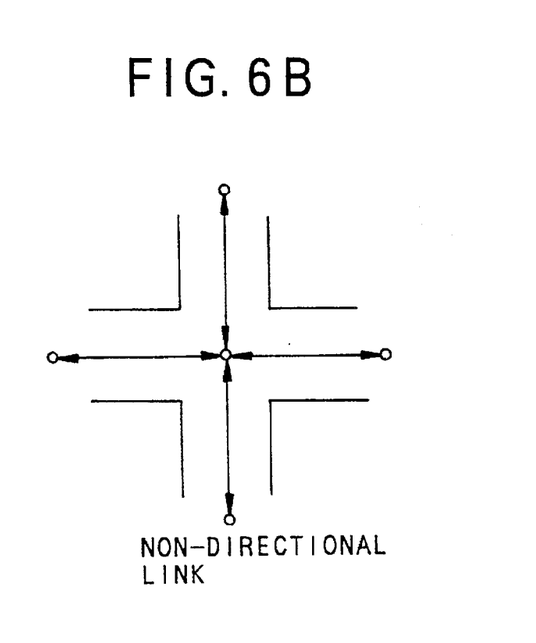

In addition, according to the study and analysis by the present inventors of the present application, in the above explained Dijkstra method, in order to express the traffic regulation condition e.g. the right or left turn prohibition and the U turn prohibition, it becomes necessary to express it by use of a directional graph as shown in FIG. 6A. Thus, at the presence of a crossing street, since the directional graph is employed, the data amount required for the route setting operation is increased to be four times as high as the case where only the non-directional graph by use of data having no directional property (distance only) as shown in FIG. 6B is employed, which is another serious problem of the navigation system.

SUMMARY OF THE INVENTION

It is therefore an object of the present invention to provide a route setting method and a route setting apparatus in a navigation system, and a navigation system having the route setting apparatus, which can certainly set a correct route to a destination even if there exists a traffic regulation, while the data amount required for the route setting operation is relatively small.

The above object of the present invention can be achieved by a route setting method in a navigation system for obtaining a shortest route from a starting position to a destination position, including the steps of: selecting, out of links each corresponding to a partial route connecting two route positions adjacent to each other on a route, candidacy links each connected to one of confirmed links which include a link corresponding to the partial route connected to the starting position and which have been confirmed; judging whether or not each of the candidacy links selected by the selecting step is allowable according to link judgement information, which corresponds to a connection relationship between each of the candidacy links and the confirmed link connected to each of the candidacy links and which is set in advance; confirming one of the candidacy links judged to be allowable by the judging step, which has the shortest integrated route distance from the starting position, as a new confirmed link; and repeating the selecting, judging and confirming steps with respect to the confirmed links including the link most recently confirmed.

According to the route setting method of the present invention, the candidacy links are selected by the selecting step. Then, it is judged whether or not each of the candidacy links is allowable according to link judgement information by the judging step. Here, the link judgement information corresponds to a connection relationship between the candidacy link and the confirmed link connected to each other, and is set in advance. Then, one of the candidacy links which has the shortest integrated route distance is confirmed as a new confirmed link. Finally, the selecting, judging and confirming steps are repeated with respect to the confirmed links including the new confirmed link.

Therefore, a link corresponding to a partial route which is connected to the destination, is always adopted as a candidacy link at any one of the steps until the link corresponding to the partial route connected to the destination is confirmed, i.e. at any one of the steps until the route setting process is ended. Here, since the selecting, judging and confirming steps are performed on the link base, the traffic regulation such as a right or left turn prohibition (which is also determined on the link base) can be also considered on the link base. By use of the process on the basis of the link, it becomes possible to judge whether or not the right or left turn is prohibited at each route position. Consequently, even if there exists a right turn prohibited portion at the vicinity of the destination for example, the shortest route can be still found in the present invention.

In this manner, according to the route setting method of the present invention, the shortest route to the destination can be certainly set regardless of the kinds of the traffic regulation.

Further, it is enough for the link judgement information to express whether or not the combination of the confirmed link and the candidacy link adjacent to each other can be adopted or not. Thus, even if the traffic regulations are expressed by the link judgement information, the data amount necessary for the link judgement information can be very small as compared with the case of the related art in which the directional graph is employed to express the traffic regulations as in FIG. 6A.

In one aspect of the route setting method of the present invention, the method may have the step of storing the link judgement information into a memory device. In this case, relatively small memory capacity is required for the memory device since the data amount of the link judgement information is small.

In another aspect of the route setting method of the present invention, the link judgement information may include an information flag which indicates whether or not each of the links in the corresponding connection relationship is allowable under a traffic regulation thereof. In this case, the data amount can be effectively saved because of the information flag.

The above object of the present invention can be also achieved by a route setting apparatus in a navigation system for obtaining a shortest route from a starting position to a destination position, provided with: a selection device for selecting, out of links each corresponding to a partial route connecting two route positions adjacent to each other on a route, candidacy links each connected to one of confirmed links which include a link corresponding to the partial route connected to the starting position and which have been confirmed; a judgement device for judging whether or not each of the candidacy links selected by the selection device is allowable according to link judgement information, which corresponds to a connection relationship between each of the candidacy links and the confirmed link connected to each of the candidacy links and which is set in advance; and a confirmation device for confirming one of the candidacy links judged to be able to pass therethrough by the judgement device, which has the shortest integrated route distance from the starting position, as a new confirmed link, the selection device selecting with respect to the confirmed links including the new confirmed link confirmed by the confirmation device.

According to the route setting apparatus of the present invention, the selection device selects the candidacy links, and the judgement device judges whether or not each of the candidacy links is able to pass therethrough according to link judgement information. Here, the link judgement information corresponds to a connection relationship between the candidacy link and the confirmed link connected to each other, and is set in advance. Then, the confirmation device confirms one of the candidacy links which has the shortest integrated route distance from the starting position, as a new confirmed link. The selection device selects with respect to the confirmed links including the new confirmed link.

Therefore, a link corresponding to the partial route which is connected to the destination, is always adopted as a candidacy link at any one of the steps until the link corresponding to the partial route connected to the destination is confirmed, i.e. at any one of the steps until the route setting process is ended. Thus, the shortest route to the destination can be certainly set according to the route setting apparatus of the present invention.

Further, it is enough for the link judgement information to express whether or not the combination of the confirmed link and the candidacy link adjacent to each other can be adopted or not. Thus, even if the traffic regulations are expressed by the link judgement information, the data amount necessary for the link judgement information can be very small.

In one aspect of the route setting apparatus of the present invention, the judgement device may have a memory device for storing the link judgement information in advance. In this case, the link judgement information can be easily stored in advance.

In another aspect of the route setting apparatus of the present invention, the link judgement information may include an information flag which indicates whether or not each of the links in the corresponding connection relationship is allowable under a traffic regulation thereof. In this case, the data amount necessary for the link judgement information can be effectively saved because of the information flag.

The above object of the present invention can be also achieved by a navigation system for a movable body provided with: the above described route setting apparatus of the present invention; and a guidance device for generating a message to guide the movable body from the starting position to the destination on the basis of the shortest route obtained by the route setting apparatus.

Thus, the aforementioned novel effect of the route setting apparatus of the present invention can be realized in the same manner according to the navigation system of the present invention.

In one aspect of the navigation system of the present invention, the guidance device may include a display device for displaying the message. Thus, the operator can easily watch the message related to the automatically set shortest route. Alternatively, the guidance device may include a voice outputting device for outputting the message by a synthetic voice. Thus, the operator can easily listen to the message related to the automatically set shortest route.

In another aspect of the navigation system of the present invention, the system may have a measurement device for measuring a present position of the movable body, and a setting device for setting the destination. The guidance device generates the message to guide the movable body from the measured present position to the destination on the obtained shortest route. Thus, the appropriate route guidance along with the movement of the movable body can be conducted.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENT

Referring to the accompanying drawings, a preferred embodiment of the present invention will be now explained.

Figure 1:
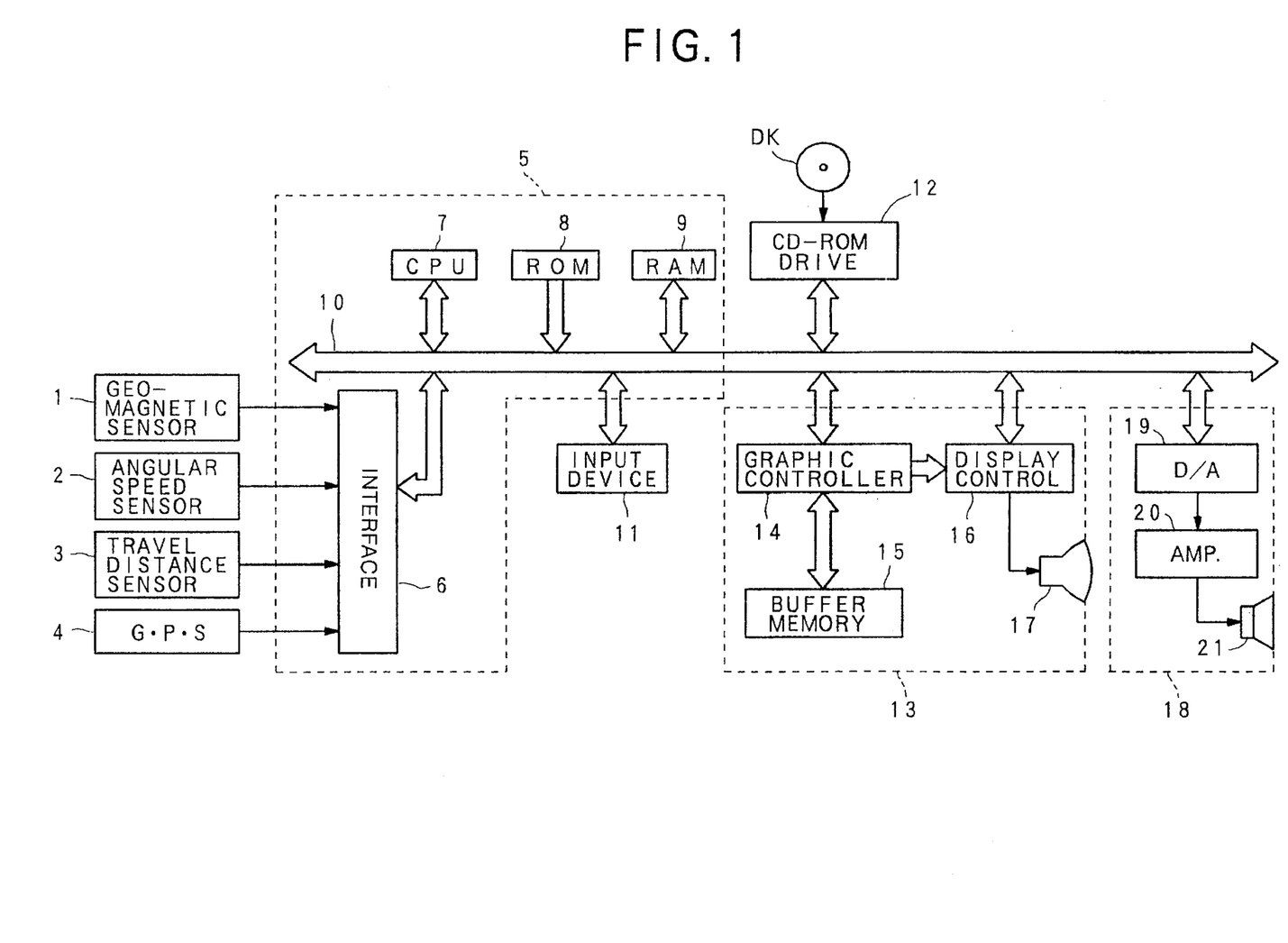
FIG. 1 is a block diagram showing a construction of a navigation apparatus as an embodiment of the present invention.

FIG. 1 is a block diagram showing a basic construction of an on-vehicle navigation system as an embodiment of the present invention.

In FIG. 1, the on-vehicle navigation system is provided with: a geomagnetic sensor 1 for outputting azimuth data regarding the direction of travel of a vehicle; an angular speed sensor 2 for detecting an angular speed at the time of the rotation of the vehicle and outputting angular speed data; a travel distance sensor 3 for outputting travel distance data by detecting and integrating the number of rotations of a shaft; a GPS receiver 4 for receiving electric waves from GPS satellites and outputting GPS measurement data; a system controller 5 for controlling a whole navigation system on the basis of the azimuth data, the angular speed data, the travel distance data and the GPS measurement data; an input device 11 for inputting various data; a CD-ROM (Compact Disk—Read Only Memory) drive 12 for reading and outputting various data from a CD-ROM disk DK under the control of the system controller 5; a display unit 13 for displaying various display data under the control of the system controller 5; and an audio reproducing unit 18 for reproducing and outputting various voice data under the control of the system controller 5.

The system controller 5 is provided with: an interface unit 6 for performing an interface operation with the external elements; a CPU 7 for controlling the whole portion of the system controller 5; a ROM (Read Only Memory) 8 for storing a control program to control the system controller 5; and a RAM (Random Access Memory) 9 having a non-volatile memory not shown for storing various data in a writable manner. The input device 11, the CD-ROM drive 12, the display unit 13 and the audio reproducing unit 18 are connected via a bus line 10.

The display unit 13 is provided with: a graphic controller 14 for controlling the whole portion of the display unit 13 on the basis of the control data from the CPU 7 which are transmitted through the bus line 10; a buffer memory 15 consisting of a memory such as a VRAM (Video RAM), for temporarily storing image information, which can be immediately displayed; and a display control unit 16 for controlling the display of the display device 17 such as a liquid crystal display device, a CRT (Cathode Ray Tube) on the basis of the image data outputted from the graphic controller 14.

The audio reproducing unit 18 is provided with: a D/A converter 19 for performing a digital/analog conversion of audio voice digital data transmitted through the bus line 10 from the CD-ROM drive 12 or the RAM 9; an amplifier 20 for amplifying an audio analog signal outputted from the D/A converter 19; and a speaker 21 for generating sound from the amplified audio analog signal.

In this case, it is assumed that link judgement data is read from the CD-ROM disk DK into the RAM 9 in advance, and the system controller 5 performs the selecting, judging and confirming the candidacy links.

Figure 2:
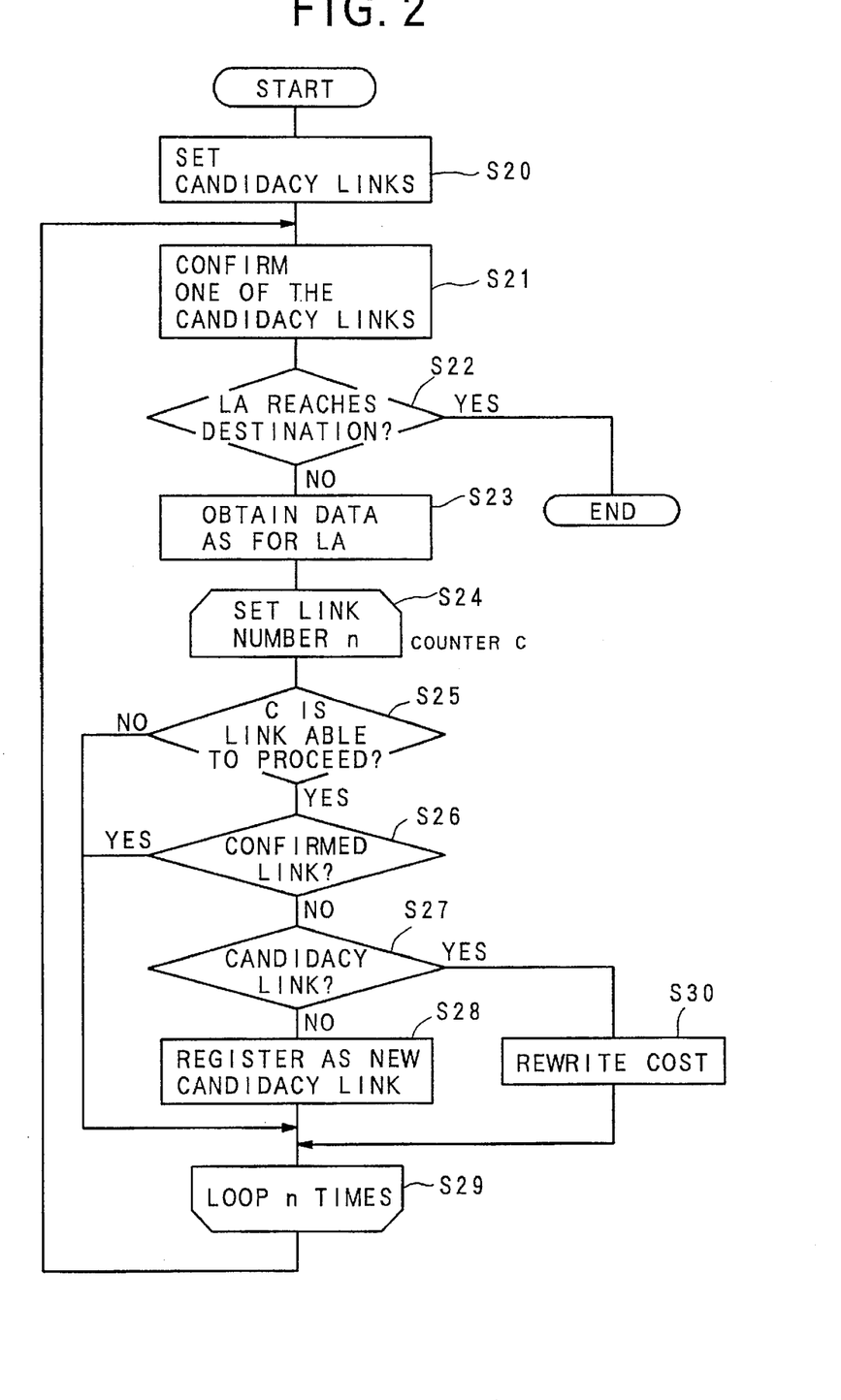
FIG. 2 is a flow chart showing an operation of the embodiment.

Next, the operation of the setting method of the present embodiment is explained with referring to FIG. 2.

First, all links which are connected to the starting position (departure point) are set as the candidacy links (step S20).

Successively, the system controller 5 determines or confirms one link (hereinbelow, it is referred to as link LA), whose cost (i.e. integrated cost which corresponds to the integrated distance from the starting position) is the minimum, out of all candidacy links (step S21).

Next, it is judged whether or not this link LA as a first link reaches the destination (step S22). If it reaches the destination (YES), the process is ended.

In the judgement in the step S22, if the link LA does not reach the destination (NO), the data with respect to the links connected to link LA, including the link judgement data as for the link LA, are obtained (step S23).

From the data as for the link LA, the total number n of the links connected to link LA is set to the counter C (step S24).

Successively, it is judged whether or not the vehicle is able to proceed to a road corresponding to the link which is expressed by the counter C on the basis of the link judgement data i.e., whether or not the link expressed by the counter C can be adopted as a candidacy link under the traffic regulation thereof (step S25).

By the judgement at the step S25, if the link expressed by the counter C cannot be adopted as a candidacy link (NO), the counter C is counted-down, so that the process of the step S25 is performed again (step S29).

By the judgement at the step S25, if the link expressed by the counter C can be adopted as a candidacy link (YES), it is judged whether or not the link expressed by the counter C is a confirmed link (step S26).

By the judgement at the step S26, if the link expressed by the counter C is a confirmed link (YES), the counter C is counted-down, so that the process of the step S25 is performed again (step S29).

By the judgement at the step S26, if the link expressed by the counter C is not a confirmed link (NO), it is judged whether or not the pertinent link is a candidacy link (step S27).

By the judgement at the step S27, if the link expressed by the counter C is not already a candidacy link (NO), the link expressed by the counter C is adopted and registered as a new candidacy link (step S28), and the counter C is counted-down, so that the process of the step S25 is performed again (step S29).

By the judgement at the step S27, if the link expressed by the counter C is already a candidacy link (YES), and in case that the integrated cost associated with the candidacy link becomes smaller if the link LA is passed through (i.e., if is adopted), the link LA the integrated cost associated with this candidacy link is rewritten to reflect connection via the link LA (step S30).

After that, the processes from the step S24 to the step 29 are performed n times on the basis of the counter C (step S29), and it returns to the process at the step S21, so that the process is performed until the new link LA reaches the destination.

By constructing in the above described manner in which the route are selected, judged and confirmed by the unit of link i.e. not by the unit of node as in the aforementioned Dijkstra method of the related art, even if the traffic regulations are considered, the shortest route can be certainly obtained which reaches the destination.

Figure 4:
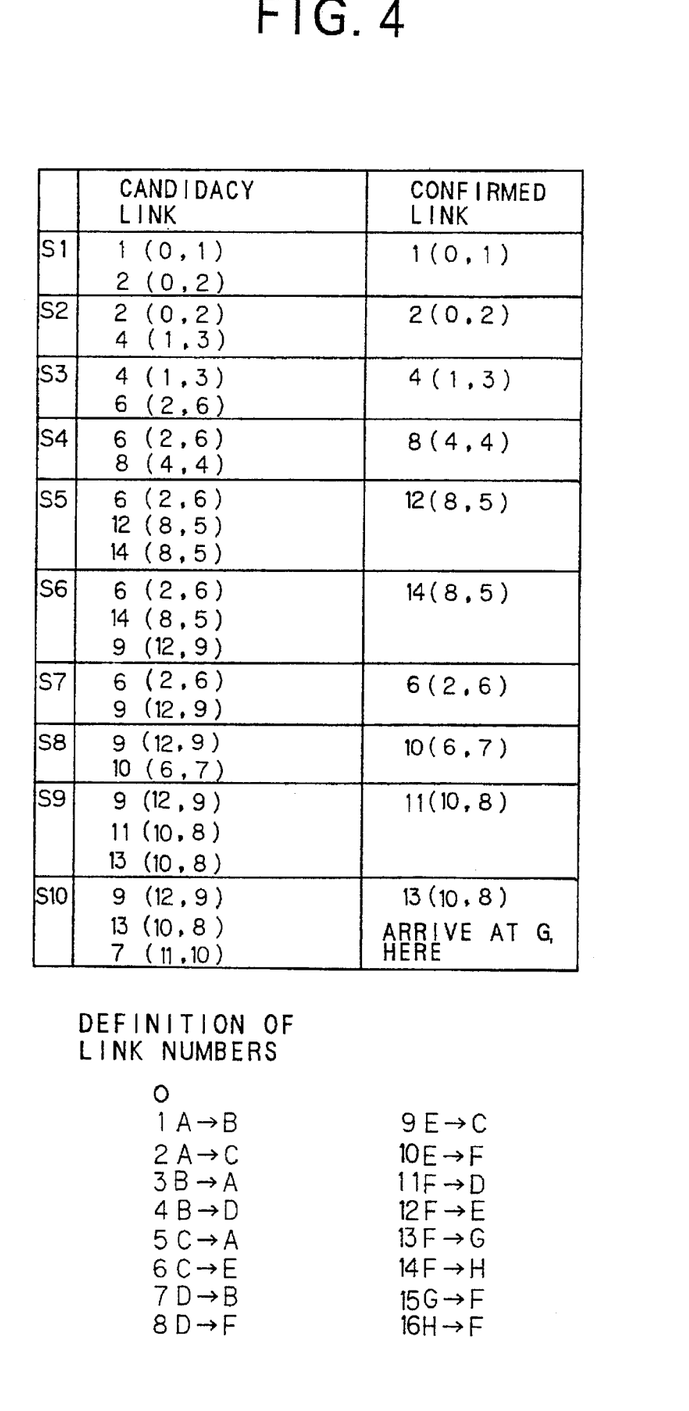
FIG. 4 is a diagram for explaining a concrete operation of the embodiment.

Nextly, the route setting method of the present embodiment is more concretely explained with referring to FIG. 3 and FIG. 4.

FIG. 3 is a route diagram for explaining a concrete operation of the route setting system.

In FIG. 3, it is assumed that the starting position is the node A, the destination is the node G, the route of node D → node F → node G cannot be adopted since the right turn is prohibited thereon, and that the U turn is also prohibited. Each numeral represents a link length or a distance between nodes.

FIG. 4 is a diagram for explaining a concrete operation of the route setting system.

In FIG. 4, the expression X (Y, Z) expresses a link number X of a candidacy link (including a directional property), a link number Y of a link which has been already confirmed one step before the candidacy link of the link number X, and an integrated cost Z (integrated distance) from the starting position to the end of the candidacy link of the link number X through the link of the link number Y. The definitions of the link numbers 1 to 16 are shown in the lower portion of FIG. 4.

More concretely, the expression 4 (1, 3) in the candidacy link column of the table of FIG. 4 for example, expresses that: the link from the node B to the node D (which link number="4") is adopted as the candidacy link; the link before this adopted candidacy link is the link from the node A to the node B (which link number="1"), and that the integrated cost from the starting position to the node D through these links (with link numbers=1 and 4) is "3".

In the explanation below, a link from the node A to the node B is expressed as a "link A → B", and a link from the node B to the node A is expressed as a "link B → A" conversely. Other links are also expressed in the same manner.

First, the node A, the starting position, is set as the confirmed node. The obtained candidacy links are the link A → B having the link number=1 (corresponding to 1(0,1)) and the link A → C having the link number=2 (corresponding to 2(0,2)). Among these candidacy links, the link which has the minimum cost is the link A → B (cost=1). Thus, the link A → B is set as the confirmed link (step S1).

As a result, the link B → D having the link number=4 which is connected to the node B is newly adopted as the candidacy link (corresponding to 4(1,3)). Thus, the link A → C and the link B → D become the candidacy links. The link which has the minimum cost among these candidacy links is the link A → C (cost=2), so that the link A → C is set as the confirmed link (step S2). In this case, the link B → A (link number=3) is not adopted as the candidacy link since it represents a U turn.

Successively, the link C → E having the link number=6 which is connected to the node C is newly adopted as the candidacy link (corresponding to 6(2,6)). The link B → D and the link C → E become the candidacy links. The link which has the minimum cost among these candidacy links is the link B → D (cost=3), so that the link B → D is set as the confirmed link (step S3).

Further, the link D → F having the link number=8 which is connected to the node D is newly adopted as the candidacy link (corresponding to 8(4,4)). Thus, the link C → E and the link D → F become the candidacy links. The link which has the minimum cost among these candidacy links is the link D → F (cost=4), so that the link D → F is set as the confirmed link (step S4).

Next, the link F → E having the link number=12 and the link F → H having the link number=14 which are connected to the node F are newly adopted as the candidacy links (corresponding to 12(8,5) and 14(8,5) respectively). Thus, the links C → E, the link F → E and the link F → H become the candidacy links. In this case, the link F → D having the link number=11 which is connected to the node F is not adopted since it represents a U turn, and the link F → G having the link number=13 is not adopted since it comes under the traffic regulation of the right turn prohibition on the basis of the link judgement data.

Although both the link F → E (cost=5) and the link F → H (cost=5) have the minimum cost among these candidacy links, the link F → E is set as the confirmed link, since the link whose link number is the minimum is set as the confirmed link in the case that a plurality of candidacy links are adopted as the link having the minimum cost (step S5).

Successively, the link E → C having the link number=9 which is connected to the node E is newly adopted as the candidacy link (corresponding to 9(12,9)). Thus, the link C → E, the link F → H and the link E → C become the candidacy links. The link which has the minimum cost among these candidacy links is the link F → H (cost=5), so that the link F → H is set as the confirmed link (step S6).

Here, since there is no link connected to the node H, the link which has the minimum cost among the remained candidacy links is the link C → E (cost=6), so that the link C → E is set as the confirmed link (step S7).

Next, the link E → F having the link number=10 which is connected to the node E is newly adopted as the candidacy link (corresponding to 10(6,7)). Thus, the link E → C and the link E → F become the candidacy links. The link which has the minimum cost among these candidacy links is the link E → F (cost=7), so that the link E → F is set as the confirmed link (step S8).

Further, the link F → D having the link number=11 and the link F → G having the link number=13 which are connected to the node F are newly adopted as the candidacy link (corresponding to 11(10,8) and 13(10,8) respectively). Thus, the link E → C, the link F → D and the link F → G become the candidacy links. Although both the link F → D (cost=8) and the link F → G (cost=8) have the minimum cost among these candidacy links, the link F → D is set as the confirmed link, since the link whose link number is the minimum is ruled in the present embodiment to be set as the confirmed link in the event a plurality of candidacy links are adopted as the link having the minimum cost (step S9). As an alternative, the link, whose link number is the maximum in place of the minimum may be set as the confirmed link depending on the manner of assigning the link numbers to the links.

On the other hand, in the event a plurality of links are adopted as the candidacy links each having the minimum cost and that there is one link which has been already adopted as the candidacy link in the process steps preceding the previous step, the link which has been adopted as the candidacy link in the earliest process step is set as the confirmed link.

In addition, it is possible to construct the apparatus such that the processes are ended by judging whether or not the link F → G reaches the node G which is the destination in this case.

In this case, since the link F → E (link number=12) has been already confirmed at the step S5 and the link F → H (link number=14) has been also already confirmed at the step S6, they are not adopted.

Successively, the link D → B having the link number=7 which is connected to the node D is newly adopted as the candidacy link (corresponding to 7(11,10)). Thus, the link E → C, the link F → G and the link D → B become the candidacy links. The link which has the minimum cost among these candidacy links is the link F → G (cost=8), so that the processes are ended since the shortest route to the node G which is the destination is confirmed.

As a result, the combination of the links from the node A, which is the starting position, to the node G, which is the destination, is the link A → C (link number=2), the link C → E (link number=6), the link E → F (link number=10) and the link F → G (link number=13), and the integrated cost thereof becomes "8".

As explained above, according to the present embodiment, a link, which is connected to the node corresponding to the destination, is always adopted as a candidacy link at any one of the steps until the link connected to the node corresponding to the destination is confirmed i.e. at any one of the steps until the route setting process is ended. Here, since the selecting, judging and confirming steps are performed on the link base, the traffic regulation such as a right or left turn prohibition (which is also determined on the link base) can be also considered on the link base. This is very different from the aforementioned route setting method by means of the Dijkstra method, in which the selecting, judging and confirming steps are performed on the node base, and in which it is not possible to judge whether the route at the node is turned right or left by use of the process on the basis of the node without the large amount of data indicating the directional graph of FIG. 6A while the data as for the route up to the pertinent node is discarded. On the contrary, in the present embodiment, by use of the process on the basis of the link, it becomes possible to judge whether the route at each node is turned right or left. Consequently, even if there exists a right turn prohibited portion at the vicinity of the destination for example, the shortest route can still be found in the present embodiment. In this manner, according to the route setting method and apparatus of the present embodiment, the shortest route to the destination can be certainly and easily set even if the traffic regulations etc. are considered.

Further, it is enough for the link judgement information to express whether or not the combination of the confirmed link and the candidacy link adjacent to the confirmed link can be adopted or not. In other words, it is not necessary to store the link judgement information with respect to one whole route consisting of a plurality of links, but it is only necessary to store the link judgement information with respect to each pair of the links adjacent to each other. Thus, even if the traffic regulations are expressed by the link judgement information, the data amount required for the expression is relatively small as compared with the original link data amount, and the capacity of the recording medium or the memory etc., can be also restrained.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A computer-implemented method in a navigation system for obtaining a shortest route via a plurality of positions, interconnected by a plurality of links, from a starting position to a destination position, wherein each of said plurality of links connects two said positions and has an associated length, said link information being stored in a memory accessible by said computer, comprising: using a computer, performing the steps of:

choosing, using said computer, a confirmed link from amongst said plurality of links which are connected to said starting position, said confirmed link having a shortest said associated length;

selecting, using said computer, candidacy links from said plurality of links, said candidacy links being connected to at least one said confirmed link at one of said plurality of positions;

judging, using said computer, whether or not each of the candidacy links selected by said selecting step is allowable according to link judgement information, said link judgement information including a connection relationship between each of the candidacy links and the confirmed link connected to each of the candidacy links, said link judgement information being set in advance;

confirming, using said computer, one of the candidacy links judged to be allowable by said judging step, said confirmed link having a shortest integrated route distance from the starting position; and repeating said selecting, judging and confirming steps with respect to the confirmed links until said shortest route is determined, and reporting said shortest route to a user.

2. A method according to claim 1, further comprising the step of storing the link judgement information into a memory device.

3. A method according to claim 1, wherein the link judgement information comprises an information flag which indicates whether or not each of the links in the corresponding connection relationship is allowable under a traffic regulation thereof.

4. A route setting apparatus in a navigation system for obtaining a shortest route via a plurality of positions, interconnected by a plurality of links, from a starting position to a destination position, wherein each of said plurality of links connects two said positions and has an associated length, comprising:

a choosing means for choosing a confirmed link from amongst said plurality of links which are connected to said starting position, said confirmed link having a shortest said associated length;

a selection means for selecting candidacy links from said plurality of links, said candidacy links being connected to at least one said confirmed link at one of said plurality of positions;

a judgement means for judging whether or not each of the candidacy links selected by said selecting step is allowable according to link judgement information, said link judgement information including a connection relationship between each of the candidacy links and the confirmed link connected to each of the candidacy links, said link judgement information being set in advance; and a confirmation means for confirming one of the candidacy links judged to be allowable by said judgement means, said confirmed link having a shortest integrated route distance from the starting position, said selection means selecting said candidacy links from said confirmed links.

5. An apparatus according to claim 4, wherein said judgement means comprises a memory means for storing the link judgement information in advance.

6. A method according to claim 4, wherein the link judgement information comprises an information flag which indicates whether or not each of the links in the corresponding connection relationship is allowable under a traffic regulation thereof.

7. A navigation system for a movable body comprising:

a route setting apparatus for obtaining a shortest route via a plurality of positions, interconected by a plurality of links, from a starting position to a destination position, wherein each of said plurality of links connects two said positions and has an associated length, and a guidance means for generating a message to guide said movable body from the starting position to the destination position on the basis of the shortest route obtained by said route setting apparatus, said route setting apparatus comprising:

a choosing means for choosing a confirmed link from amongst said plurality of links which are connected to said starting position, said confirmed link having a shortest said associated length;

a selection means for selecting candidacy links from said plurality of links, said candidacy links being connected to at least one said confirmed link at one of said plurality of positions;

a judgement means for judging whether or not each of the candidacy links selected by said selecting step is allowable according to link judgement information, said link judgement information including a connection relationship between each of the candidacy links and the confirmed link connected to each of the candidacy links, said link judgement information being set in advance; and a confirmation means for confirming one of the candidacy links judged to be allowable by said judgement means, said confirmed link having a shortest integrated route distance from the starting position, said selection means selecting said candidacy links from said confirmed links.

8. A navigation system according to claim 7, wherein said guidance means comprises a display means for displaying the message.

9. A navigation system according to claim 7, wherein said guidance means comprises a voice outputting means for outputting the message by a synthetic voice.

10. A navigation system according to claim 7, further comprising:

a measurement means for measuring a present position of said movable body; and a setting means for setting the destination, said guidance means generating the message to guide said movable body from the measured present position to the destination on the obtained shortest route.

* * * * *